United States Patent

[11] 3,591,260

[72] Inventors  Daniel C. Harrington
              Fridley;
              Robert L. Lillestrand, Edina, both of,
              Minn.
[21] Appl. No.  740,377
[22] Filed      June 26, 1968
[45] Patented   July 6, 1971
[73] Assignee   Control Data Corporation
                Minneapolis, Minn.

[54] CONSTANT TIME RESPONSE SCANNER
     14 Claims, 9 Drawing Figs.
[52] U.S. Cl. .................................................. 350/274,
     356/140, 356/141, 356/148, 250/203
[51] Int. Cl. ................................................... G02f 1/30
[50] Field of Search........................................ 350/274;
     356/140, 141, 147, 148, 150, 151, 152, 153;
     250/203

[56]            References Cited
            UNITED STATES PATENTS
3,000,255   9/1961   Iddings........................... 356/141
3,143,654   8/1964   Aroyan et al. .................. 250/203 X
3,144,555   8/1964   Aroyan et al. .................. 250/203 X
3,274,393   9/1966   Zuckerbraun.................... 350/274 X Primary Examiner—Ronald L. Wibert
Assistant Examiner—Paul K. Godwin
Attorney—Thomas G. Devine ABSTRACT: The invention relates to an optical scanning system with a rotating disc having slits fabricated so that the signal produced during scanning has a constant time response. More particularly, the widths, of the slits are governed by the general formula:

$$w = \frac{\rho\Delta\theta}{\left[1+\rho^2\left(\frac{d\theta}{d\rho}\right)^2\right]^{1/2}}$$

where $\omega =$ slit width
$\Phi =$ distance of a point along the slit from the axis of rotation
$\theta =$ the angle of a point along the slit from a horizontal axis Pie-section slits, Archimedes spirals, logarithmic spirals, involutes, constant width slits and others can be constructed to satisfy this general formula.

INVENTORS
ROBERT L. LILLESTRAND
DANIEL C. HARRINGTON
BY Thomas O. Devine
ATTORNEY

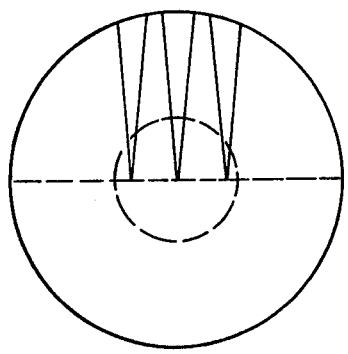
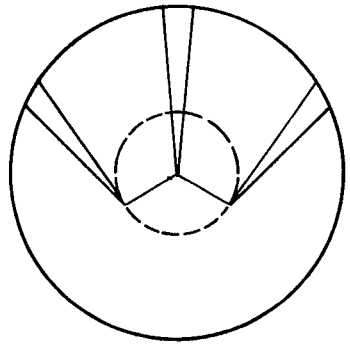
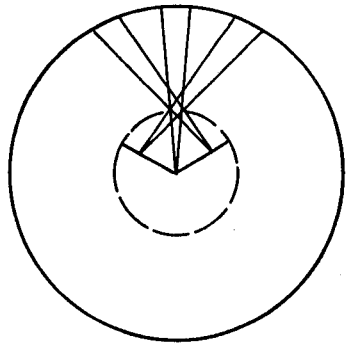
FIG. 5
FIG. 6A ARCHIMEDIAN $\rho = a\theta$
FIG. 6B LOGARITHMIC $\rho = \rho_0 e^{c\theta}$
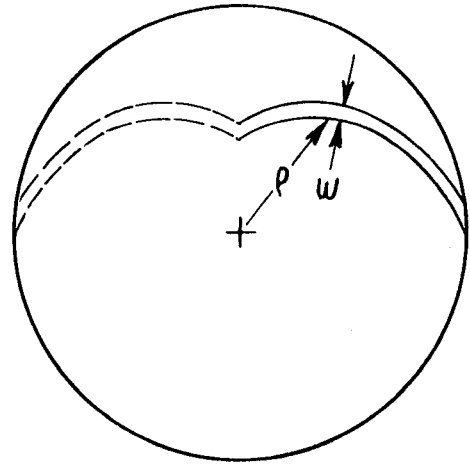
FIG. 7
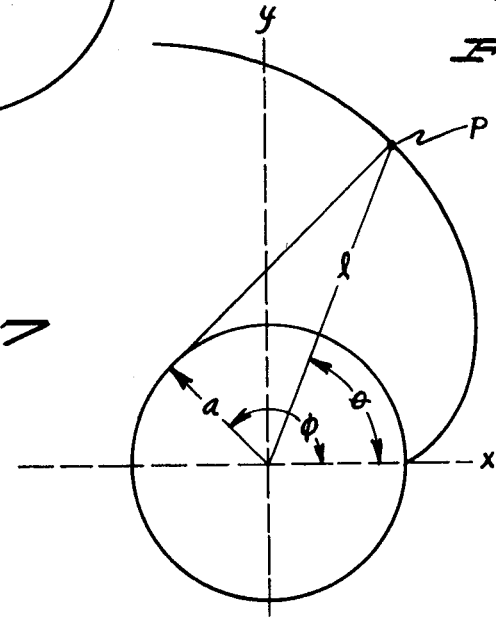
INVENTORS
ROBERT L. LILLESTRAND
DANIEL C. HARRINGTON
BY Thomas G. Devine
ATTORNEY

CONSTANT TIME RESPONSE SCANNER

BACKGROUND OF THE INVENTION

The same methods of celestial navigation which for years have guided mariners across the seas also direct the thrust of man into space. Ancient sailors without knowledge of gyroscopes, or inertial platforms, looked to the stars for guidance in navigating. Then, the sky was widely regarded as a sphere with some lamps, the stars, embedded permanently on the globe and other bodies, such as the moon and planets, movable on it. The actual incorrectness of this view does not dim its physical insight, for the stars are in fact so distant that, from a suitable platform they appear permanently fixed in the sky. If the brightness and separation of a recognizable few of the millions of stars can be sensed, the orientation of a body in space can be determined.

In the past, locations and attitudes in space have been predetermined by using instruments to measure the apparent position of, and the angles between, celestial bodies; by making the measurements relative to some stabilized plane of reference, or by measuring angular relationships between a planet and a relatively small field of stars. These methods require complex and expensive equipment which occupies a great deal of space and utilize considerable power. In contrast, in U.S. Pat. No. 3,290,933, issued on Dec. 13, 1966 to Robert L. Lillestrand et al., there is disclosed an effective system which requires much less equipment and limited space.

Lillestrand et al. in their patent describe a system and method including a uniformly rotating optical scanner which is capable of determining the location and attitude of a vehicle by scanning a continuous narrow section of space and making an attitude determination based upon the positions of several of the brightest celestial bodies which happen to lie in the sector scanned. This sector can be either a conical section resulting from rotation about an axis parallel to the direction of scan or a continuous strip resulting from rotation about an axis perpendicular to the axis of scan. The scanner ordinarily has a field of view of about 30° and, utilizing just 70 of the approximately 100 stars having magnitudes equal to or greater than 2.6 magnitude, at least three of these stars are present in any sector of the celestial sphere. The magnitudes of these three stars or their angular separation can then be compared with data stored within or generated by a computer to provide position information.

An optical scanner can, for example, consist of two slits which admit light from the scanned sector to a photomultiplier. Bodies within the field of view which are brighter than a maximum value are rejected as planets. In addition, weak stars and background noise are not considered. Only bodies having brightness within predetermined limits are noted as being stars from which useful data can be obtained. The magnitudes of these stars and their angular separation is recorded. Also, the distance each star is from the optical axis is determined from the time the star enters one slit till it enters the other. These three variables are sufficient to determine orientation of the vehicle with respect to the celestial sphere.

SUMMARY OF THE INVENTION

This invention concerns optical scanning systems whereby an opaque surface rotates about an axis of rotation, admitting light through one or more slits in the surface. The surface is used for scanning an area of the celestial sphere, distinguishing known stars by the signals produced as they transit the slits. According to the invention, the slit width (designated as $\omega$), the distance of a point along the slit from the axis of rotation (defined as $\rho$), and the angle ($\theta$) of this point from an arbitrary axis in the plane of the surface are arranged according to the general formula:

$$w = \frac{\rho \Delta \theta}{\left[1 + \rho^2 \left(\frac{d\theta}{d\rho}\right)^2\right]^{1/2}}$$

Slits having widths governed by the foregoing develop a constant time response signal.

In addition, a radial pie-section slit will yield a constant time response if the width increases in accordance with the relation:

$$w = 2\rho \sin \frac{\Delta \theta}{2}$$

If $\Delta \theta \leq 30°$, a satisfactory approximation is $\omega = \Delta \theta \rho$.

Nonradial pie-section slits also can be used to obtain a constant time response provided that the vertex of the slit lies on a radial line from the axis of rotation and the center line of the slit is perpendicular to this radial line.

A plurality of slits will all have the same time response even if they are not parallel provided that all are in accordance with the above general relation and all have the same $\Delta \theta$.

A variety of nonstraight slits can also be developed so as to produce a constant time response. An Archimedean spiral "one in which the radius vector bears a constant ratio to the vectorial angle, ($\rho = a$; where $a$ = constant)" must have a width defined by $$w = \frac{\Delta \theta}{\left[\frac{1}{\rho^2} + \frac{1}{a^2}\right]^{1/2}}$$

Further, a logarithmic spiral one in which the logarithms of radii vectors are in the same ratio as the vectorial angles, i.e. log $$\frac{\rho}{\rho_0} = c\theta, \text{ or } \rho = \rho_0 e^{c\theta}$$

where $\rho_0 = \rho$ when $\theta = 0$ and $c$ is a constant of proportionality, has a width in accordance with $$w = \frac{\rho \Delta \theta}{\left[1 + \frac{1}{c^2}\right]^{1/2}}$$

Also, an involute can be used if the width is defined by $\omega = \alpha \Delta \theta$ (where $\alpha$ = the radius).

Accordingly, it is an object of this invention to provide improved slit geometries in optical scanning apparatus, to yield output signals having a substantially constant time response for constant scanning rates.

BRIEF DESCRIPTION OF THE DRAWINGS

FIG. 5 illustrates additional nonradial, nonparallel slits which provide constant time response;

FIGS. 6A and 6B illustrate Archimedean and Logarithmic spiral slits which provide constant time response;

FIG. 7 illustrates an involute which provides a constant time response;

DETAILED DESCRIPTION OF THE INVENTION

Figure 1:
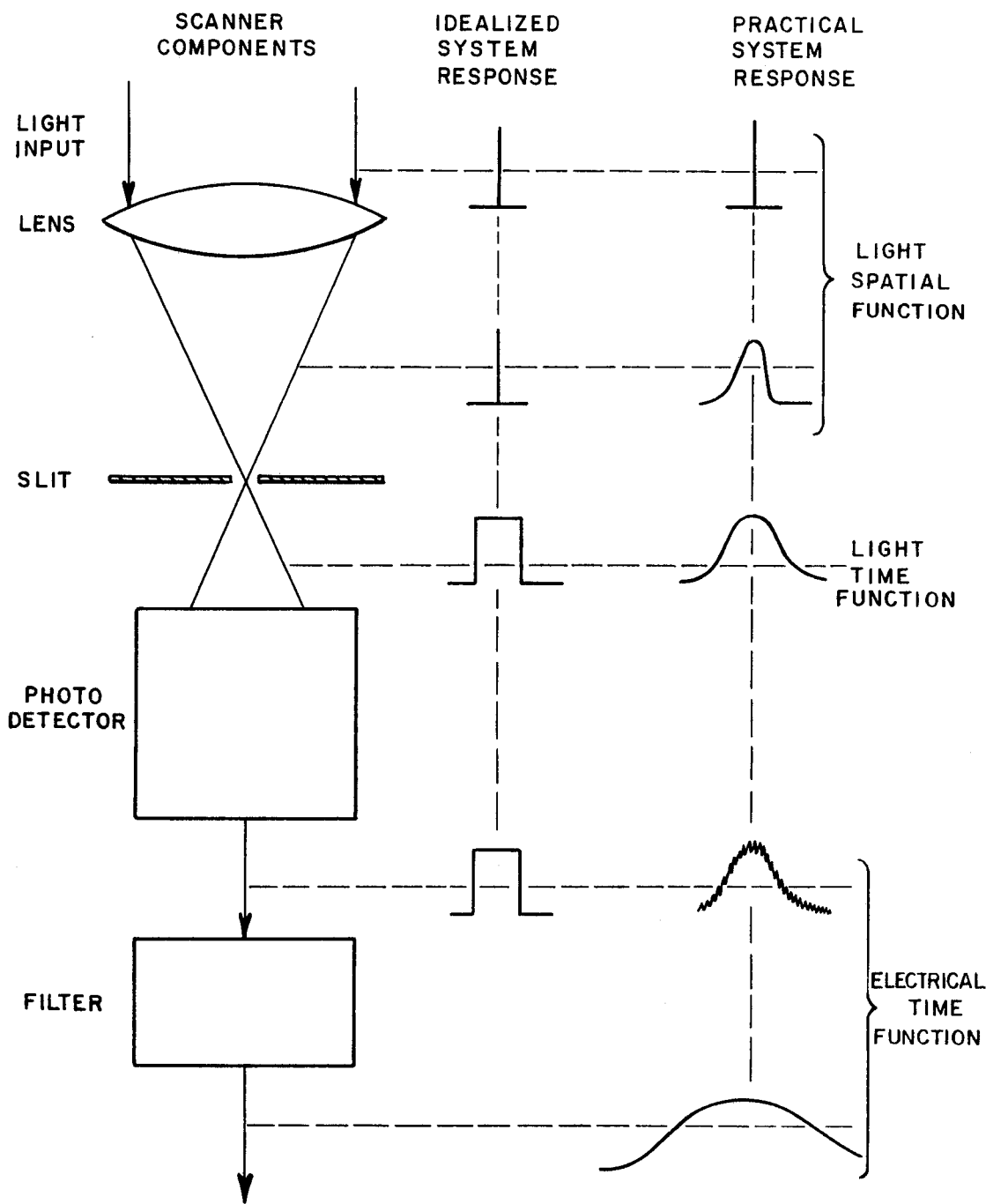
FIG. 1 illustrates both the idealized and practical system response of the various elements in an optical scanner.

The constant time response scanner was developed for detecting the direction to two or more known essentially point light sources, and thus enabled a determination of the space orientation of the scanner frame. The scanner consists of an optical system with a rotating assembly of narrow slits at or near the focal surface, and a light detector to convert light passing through the slits to electrical signals as shown in FIG. 1. The electrical signals are filtered to remove noise, and star direction is determined from calculations based on the time occurrence of the signal with respect to a reference—which could be another star. Since one or more spatial coordinates of the point light sources are converted to time differences in the scanner system, it is extremely important that the time response of the system be constant for stars of varying magnitudes and directions. One method of determining the time of occurrence of the output signal is by taking the average of two equal-amplitude points which are at or near one-half peak amplitude. The difficulty with this method is that the time position of these points are dependent upon slit geometry and relative position of the light source from the optical axis.

As is illustrated in FIG. 1, the idealized system response to a point light source yields a markedly different signal output than the response of any practical system. In a practical system, it is necessary to reduce noise bandwidth by optimum or near optimum filtering. In a practical system, the light source image which is received by the detector will have a time dimension determined by slit width and the speed at which the slit passes under the image. While the filter ideally is designed for a particular pulse width, a variation of $$T/2 \leq \tau \leq 2T$$

where $T$ is equal to pulse width at half amplitude points, will not appreciably affect the pulse symmetry.

If a finite image size is considered, pulse width is further increased and the possibility of exceeding filter design limitations is correspondingly increased. This problem is overcome by the more complex methods of determining slit shape which are described in this specification.

It is desirable that the output signal from the photodetector have a shape which is independent of the radial distance ($\rho$) of the star image from the optical axis. To the extent that this is not the case, the design of the electronic filters for noise discrimination is compromised for signals received at certain $\rho$ values. Since all signals are processed through common filter circuits, the response characteristics of all star/slit combinations at all locations in the field of view should be as consistent as possible.

There are many factors which can contribute to a photodetector output signal waveshape which varies for images received at different off-axis radial distances. Some of these factors are related to lens and optical system imperfections while some are related to the geometry of the slits. To consider the effect of slit geometry on photodetector output signals, assume the scanning disc has radial slits of constant width and is rotating at a a constant angular velocity. The amount of light admitted by such slits is dependent upon the slit width, the image size, and the radial distance of the image from the optical axis. Thus, images which are scanned at short radial distances $\rho$ will generate longer electrical waveshapes from the photodetector than images which are scanned at long radial distances. If the slits are radial from the optical axis, this effect may be eliminated by using pie-shaped slits, wherein the increase in linear scanning velocity with increased $\rho$ is compensated for by a corresponding increase in slit width.

In practice the inner zone of the pie-shaped radial slit is blacked-out where the image size is larger than the slit width. When this is accomplished, the electrical waveshapes from all images received anywhere along the slit will be very nearly identical. This greatly simplifies the filter design and the problem of signal recognition.

Figure 2:
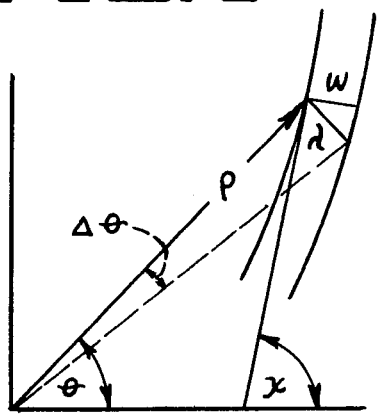
FIG. 2 illustrates the geometry involved in calculating the general equation for slit width giving constant time response.

Referring now to FIG. 2, and considering a more general representation of the slit geometry, if $\Delta\theta$ is the angle through which the scanner rotates from the point at which a star of infinitesimal diameter enters the slit to the point at which it leaves, then $\Delta\theta=\tau/\rho$. Since $\tau=\omega/\cos(\psi-\theta)$, where $\psi$ is the angle between the reference axis and a line tangent to the curve at point $(\rho,\theta)$ and $\Phi$ is the angle between radius vector $\rho$ and the tangent line at point $(\rho,\theta)$ the required slit width can be calculated from $\omega=\rho\Delta\theta\cos(\psi-\theta)$ provided $\omega<<\rho$. But $\psi-\theta=\Phi$, and when using polar coordinates $\tan\Phi=\rho(d\theta/d\rho)$, therefore the general equation is $$w = \frac{\rho\Delta\theta}{\left[1-\rho^2\left(\frac{d\theta}{d\rho}\right)^2\right]^{1/2}}$$

Thus, knowing the mathematical form of the slit and selecting an angle $\Delta\theta$, then the manner in which the slit must vary as a function of radius can be computed.

Now that the general equation has been defined, the relationship of the general formula to specific slits will be developed

STRAIGHT SLITS

A. Parallel Slits

Figure 3:
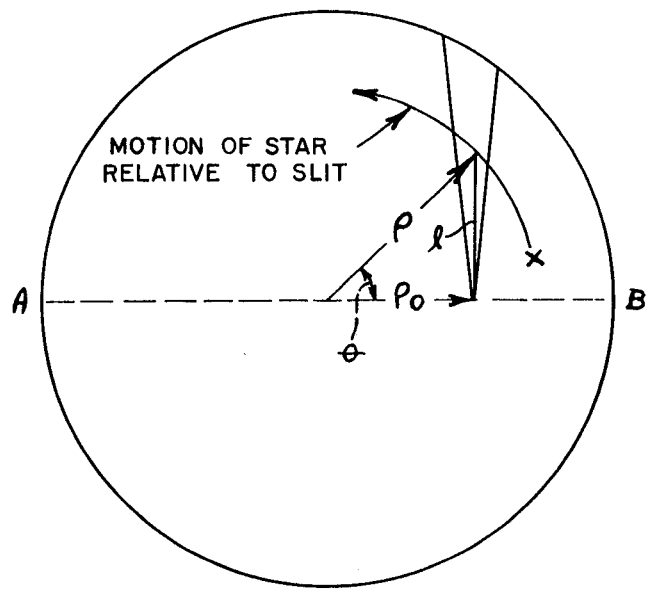
FIG. 3 illustrates a straight, nonradial slit which provides a constant time response.

For example, consider the case illustrated by FIG. 3 in which a nonradial slit is used. The equation for the line defined by the center of this slit is simply $\cos\theta=\rho_0/\rho$. Differentiating, we find that $(d\theta/d\rho)=(\cot\theta)/\rho$. If one now substitutes into the above general equation, it can be seen that:

$$\omega=\rho_0\Delta\theta\tan\theta$$

But $\tan\theta=l/\rho_2 o$ and therefore $\omega=\Delta\theta l$. Since the width of the slit is simply proportional to $l$, it is evident that a pie-section slit will provide the desired characteristic. This is shown as FIG. 3. It is further evident that this conclusion is independent of $\rho_0$, so that any set of parallel pie-section slits drawn perpendicular to the diameter (A—B) will have the same property for all values of $\rho$.

B. Nonparallel Slits

More generally, it should be noted that any pie-section slit which is 1. perpendicular to any radial line and which has
2. the vertex of the slit on this line generates $\rho$-invariant output pulses. This geometry is shown in FIG. 4.

Figure 4:
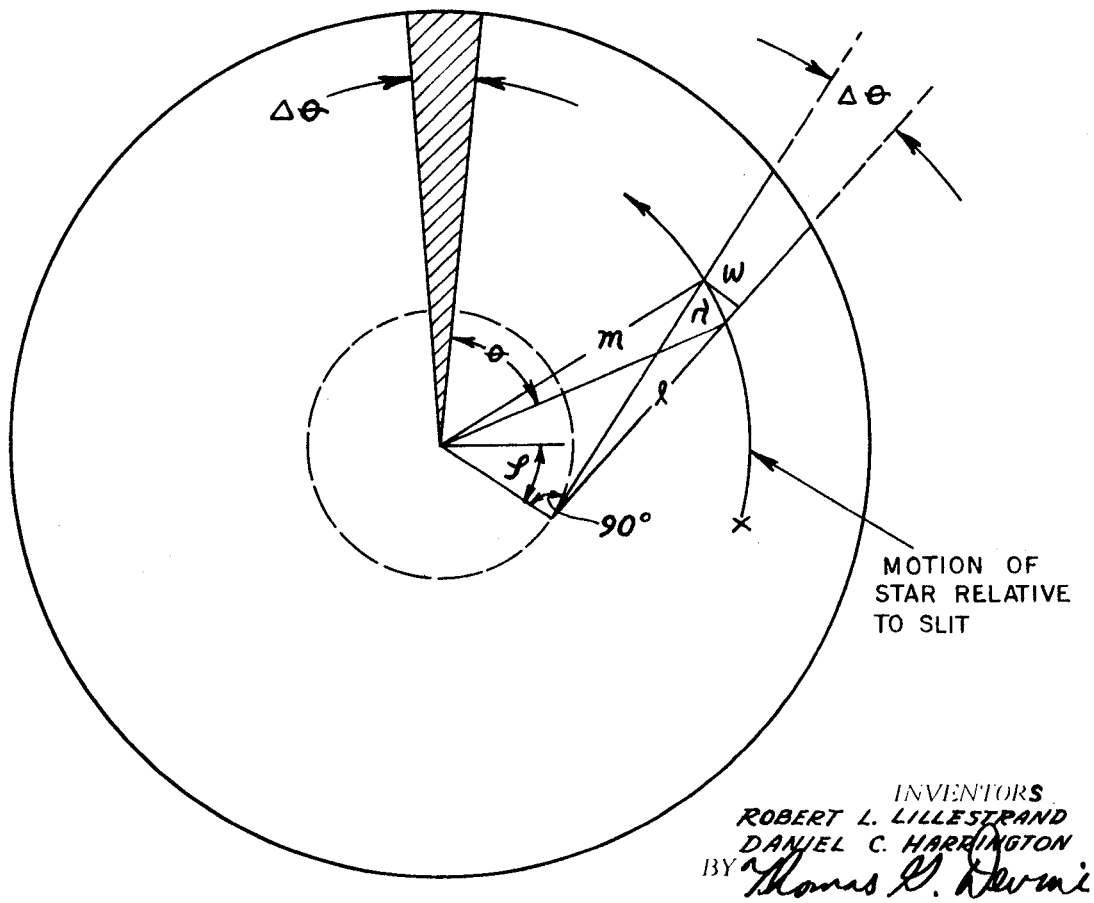
FIG. 4 illustrates a nonparallel slit which provides a constant time response.

Assume the two slits shown in FIG. 4 have the same wedge angle, $\Delta\theta$. One of these slits is purely radial and therefore generates a pulse of angular width $\Delta\theta$. The second slit is nonradial, but drawn in accordance with the two criteria cited above. For a star crossing this second slit, the angular rotation of the scanner is $\Delta\theta_2=\tau/m$. From FIG. 4, it is also evident that $$\lambda=\frac{w}{\cos(\theta-e)} \quad m=\frac{l}{\cos(\theta-e)}$$

Thus, $\Delta\theta_2=\omega/l$ and this is simply $\Delta\theta$. The property of invariant time response therefore follows because both $\tau$ and $m$ are equally increased by the amount $$[\cos(\theta\rho)]^{11}$$

Nonradial slits are used as a part of the process of determining the complete polar coordinates of each star falling within the field of view. Because of the above-cited property, a star at any radial distance crossing any of the slits in any of the three slit configurations shown in FIG. 5 will yield the same time response. In fact, the $\rho$, $\theta$ coordinates could be determined with only two slits for any of the cases shown in FIG. 5. The region near the vertex of the wedge-shaped slits is usually masked off because the star image is so large compared with the slit width that no usable signal would be obtained.

SPIRAL SLITS

The general equation developed hereinbefore can be applied to a number of other slit configurations; that is, other than the straight slits considered thus far. One additional class of slits is the spiral design. Two types of these are:

1. Archimedean, $\rho=\alpha\theta$
2. Logarithmic, $\rho=\rho_0 e^c$

The Archimedean spiral has the advantage of simplifying the calculation of $\rho$ since it is merely proportional to $\theta$; however, the Logarithmic spiral although more complicated, has the property of yielding a $\sigma_\rho$ which is independent of $\rho$.

FIG. 6 shows the spirals as they might be laid out on a scanner disc. In this case, it is assumed that two oppositely directed, but identical, spirals are used to determine the $\rho$, $\theta$ coordinates of the star. Applying the general equation to the Archimedean spiral yields the result that the slit width ($w$) is proportional to the off-axis angle ($\rho$), since $\Delta\theta$ and C are constants. More particularly, the relation is expressed by:

$$w=\frac{\Delta\theta}{\left[\frac{1}{\rho^2}+\frac{1}{a^2}\right]^{1/2}}$$

This is the same rule for the pie-section radial slit. In the case of the Logarithmic spiral, the application of the general equation leads to a more complicated relation between $\omega$ and $\rho$ which is:

$$w = \frac{\rho \Delta \theta}{\left[1 + \frac{1}{c^2}\right]^{1/2}}$$

INVOLUTE

The involute represents a type of curve which provides a constant $\Delta\theta$ for all values of $\rho$ when fabricated with a slit of constant width. Figure 7 illustrates the shape of an involute. The Cartesian coordinates of a point P are given by:

$$x = a\cos\Phi + a\Phi\sin\Phi$$
$$y = a\sin\Phi - a\Phi\cos\Phi$$

Letting $\rho = [x^2 + y^2]^{1/2}$, the $\rho$, $\Phi$ coordinates of the point P are calculated as:

$$\rho = (1 + \Phi^2)^{1/2}$$

From the geometry of FIG. 7, the relationship of $\Phi$ to $\theta$ can be determined as:

$$\Phi = \theta + \cos^{-1}(a/\rho)$$

Substituting this equation for $\Phi$ into the previous equation, the polar coordinates of the point P can be determined. Further, substituting these polar coordinates into the general equation leads to the following relationship:

$$\omega = a\Delta\theta$$

This equation illustrates that, for a slit of constant width fabricated in the shape of an involute of a circle, the angular width $\Delta\theta$ of the slit is constant and therefore independent of the off-axis angle $\rho$. Thus, for a constant width involute, it is possible to achieve a constant time response at any off-axis distance. This leads to some advantageous possibilities, for the fabrication of a slit of constant width is obviously easier to accomplish than one where slit width is made a function of off-axis distance $\rho$.

Figure 8:
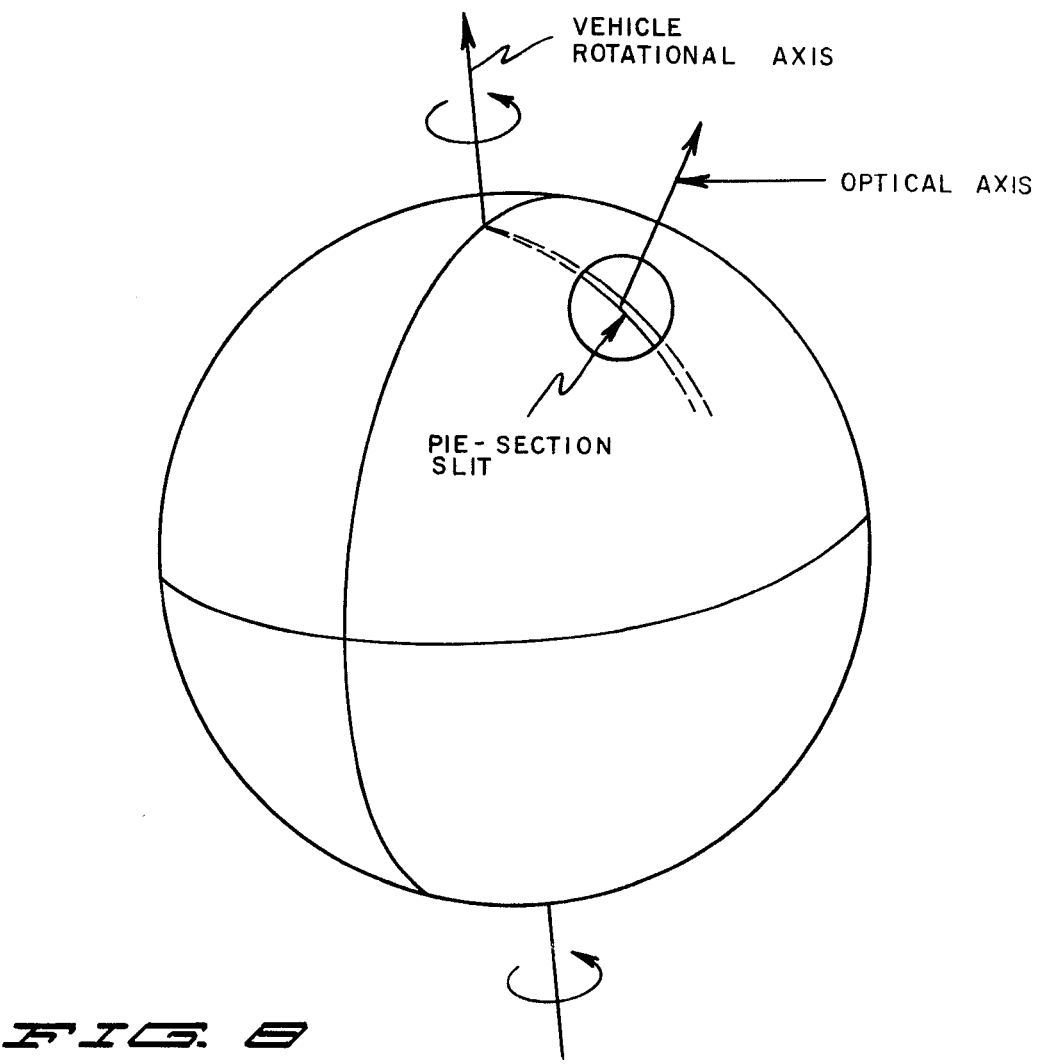
FIG. 8 illustrates the general case where the axis of rotation does not coincide with the center of the disc.

FIG. 8 illustrates the use of this invention when the disc rotates about an axis which does not coincide with the optical axis. A typical application for this type of operation would be a case where the disc is fastened to a space vehicle at a point off the vehicle's spin axis. In this case it is unnecessary for the disc itself to be rotated relative to the space vehicle, for the disc rotation relative to the observed star field is accomplished by means of the space vehicle spinning. The time response for slit geometry calculations is therefore related to the vehicle rotational axis and not to the optical axis. The equations previously illustrated can be utilized in this type of operation as well, for their elements require only that the relationship with the *rotational* axis be defined. For example, FIG. 8 illustrates a radial pie-section slit, where the radial point is the axis of rotation.

The above-described embodiments are illustrative of preferred embodiments of the invention but are not intended to limit the possibilities of insuring improved constant time response detection of radiation sources. For example, the function performed by an opaque surface with transparent slits, which allows light to reach a photodetector apparatus, can equally well be performed by and is completely equivalent to an apparatus wherein slit-shaped solid-state light detectors are used. In such an apparatus equivalence is dependent only on whether the width of the slit-shaped detectors is governed by the inventive relationships herein described. It will become apparent to one skilled in the art that certain other modifications may be made within the spirit of the invention as defined by the appended claims.

What we claim is:

1. An optical scanning apparatus including a body having a surface rotating relative to the celestial background about an axis of rotation, said surface having at least one slit of pie-section shape, the slit comprising a predetermined constant wedge angle ($\Delta\theta$) and vertex point defined by the following relationship:
   a. the vertex point being displaced from the axis of rotation along a line drawn radially from the axis of rotation;
   b. the wedge angle being located so that its bisector is perpendicular to the radial line along which the vertex point is located.

2. An apparatus as claimed in claim 1 further comprising an optical lens system, the surface being positioned to coincide with the optical focal surface of the optical lens system.

3. An apparatus as claimed in claim 2, wherein the surface comprises a rotating disc.

4. An apparatus as claimed in claim 3 wherein the axis of rotation of said disc coincides with the optical axis of the optical lens system.

5. An apparatus as claimed in claim 1 wherein the vertex points of all slits are located along a common line drawn through the axis of rotation.

6. An apparatus as claimed in claim 3 wherein the vertex points of all slits are located along a common diameter of said disc.

7. An optical scanning apparatus including a surface rotating relative to the celestial background, said surface having slits in the shape of Logarithmic spirals, the width ($w$) of said slits at any point on the surface being governed by the relationship of the distance ($\rho$) of the point from the axis of rotation, the wedge angle ($\Delta\theta$) of the slit as measured from the axis of rotation, and a predetermined constant ($c$), according to the equation:

$$w = \frac{\rho \Delta \theta}{\left[1 + \frac{1}{c^2}\right]^{1/2}}$$

8. An apparatus as claimed in claim 7 further comprising an optical lens system, the surface being positioned to coincide with the optical focal surface of the optical lens system.

9. An apparatus as claimed in claim 8 wherein the surface comprises a rotating disc.

10. An apparatus as claimed in claim 9 wherein the axis of rotation of said disc coincides with the optical axis of the optical lens system.

11. An optical scanning apparatus including a surface rotating relative to the celestial background, said surface having slits in the shape of Archimedean spirals, the width ($w$) of said slits at any point on the surface being governed by the relationship of the distance ($\rho$) of the point from the axis of rotation, a predetermined constant wedge angle ($\Delta\theta$), and a predetermined constant ($a$), according to the equation:

$$w = \frac{\Delta \theta}{\left[\frac{1}{\rho^2} + \frac{1}{a^2}\right]^{1/2}}$$

12. An apparatus as claimed in claim 11 further comprising an optical lens system the surface being positioned to coincide with the optical focal surface of the optical lens system.

13. An apparatus as claimed in claim 12 wherein the surface comprises a rotating disc.

14. An apparatus as claimed in claim 13 wherein the axis of rotation of said disc coincides with the optical axis of the optical lens system.